(12) United States Patent
Osborn et al.

(10) Patent No.: US 6,486,653 B2
(45) Date of Patent: Nov. 26, 2002

(54) MOUNTING ARRANGEMENT FOR A WHEEL SPEED SENSOR

(75) Inventors: Jason A. Osborn, Oakes; Neil A. Fuchs, Rutland; Kenneth R. Weber, Milnor; Corey L. Fornes, Lisbon, all of ND (US); A. John Santos, Farmington; Arnold M. Terrill, Thomaston, both of CT (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/733,221

(22) Filed: Dec. 8, 2000

(65) Prior Publication Data

US 2002/0070727 A1 Jun. 13, 2002

(51) Int. Cl.⁷ .................................................. G01P 3/48
(52) U.S. Cl. ............... 324/174; 324/207.25; 324/207.2; 310/68 B
(58) Field of Search ............................. 324/174, 207.2, 324/207.25, 235; 338/324; 310/68 B; 318/653

(56) References Cited

U.S. PATENT DOCUMENTS 5,560,462 A * 10/1996 Gustin ..................... 324/207.2

FOREIGN PATENT DOCUMENTS

| DE | 196 50 446 A | 7/1997 |
|----|--------------|--------|
| EP | 0 263 558 A  | 4/1988 |
| EP | 0 765 773 A  | 4/1997 |

* cited by examiner

Primary Examiner—Walter E. Snow
(74) Attorney, Agent, or Firm—Westman, Champlin & Kelly, P.A.

(57) ABSTRACT

A sensor for sensing the rotation of an output shaft of a motor used for driving a vehicle includes a disc on the output shaft that carries magnets facing toward a motor carrier and the motor. The motor carrier has an annular recess open on a side facing away from the motor, and a Hall effect sensor is placed in this recess and held with a T-shaped bracket having a tang that supports the Hall effect sensor partially in this annular recess for protecting it and positioning it adjacent the magnets on the disc.

9 Claims, 2 Drawing Sheets

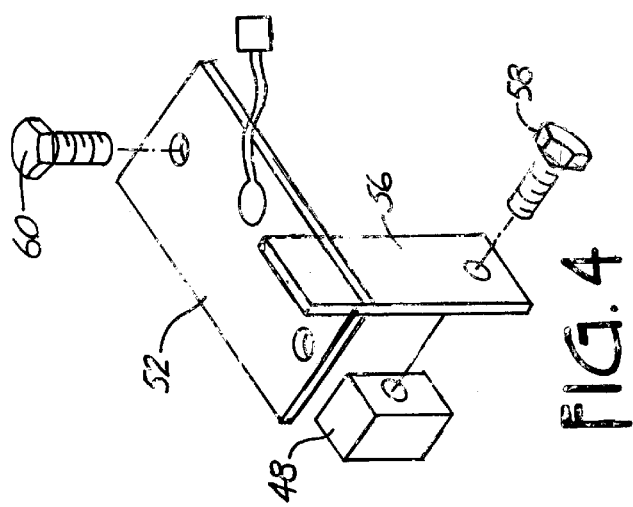
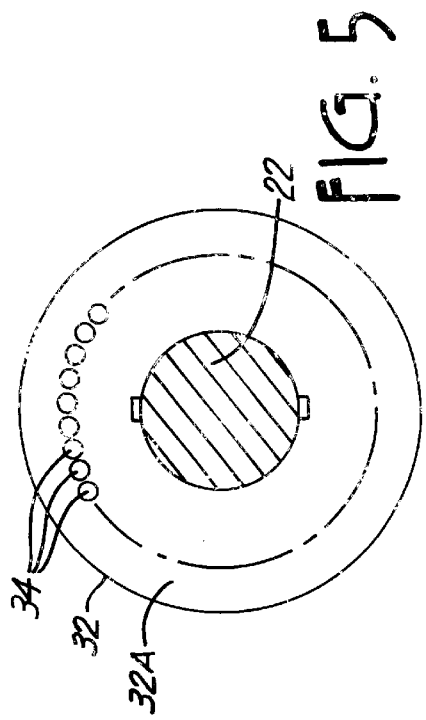
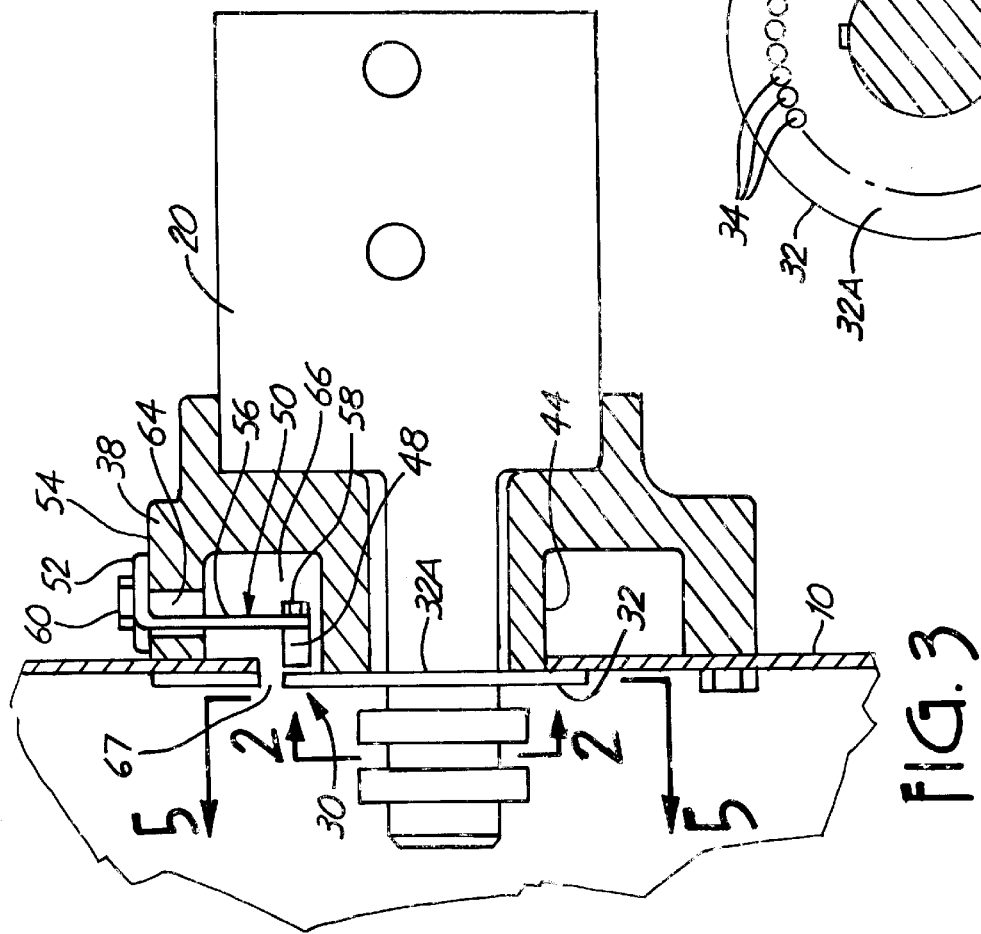

MOUNTING ARRANGEMENT FOR A WHEEL SPEED SENSOR

BACKGROUND OF THE INVENTION

The present invention relates to a sensor for sensing wheel speed in a vehicle powered by a hydrostatic motor. In particular, the present invention relates to a mounting that is adapted for utilizing the existing hydrostatic motor carrier and output drive shaft for mounting a sensor in a location where it is not susceptible to damage.

In compact loaders, such as all-wheel drive, all-wheel steer loaders, it is desirable to accurately sense the speed of the wheels on each side of the vehicle to efficiently control operation and insure that the wheel speeds are properly controlled. The signals representing wheel speed can be coordinated with a sensed angle of steer and used in a control algorithm to reduce the speed of the inside wheels on a turn in order to prevent skidding during the turn.

In compact industrial vehicles, space is at a premium and mounting sensors that will provide an accurate indication of wheel speed is difficult because of the need to protect the sensors from damage during use, and be out of the way as well as conserving space.

SUMMARY OF THE INVENTION

The present invention relates to a sensor for sensing the rotation of a positive drive shaft driving the wheels of a vehicle, such as a compact four-wheel loader. The sensor is mounted with a unique bracket onto a motor carrier or support and it is used in connection with a rotating disc having rotational position identifiers that provide a pulse as they pass a stationary sensor as the disc rotates. The disc is attached to the output shaft of the motor. The output shaft is used for driving sprockets that in turn drive chains to the final drive axles of the vehicle.

The bracket is a simple T-shaped bracket that is supported on the motor carrier, or other portions of the motor frame. The bracket carries a Hall effect sensor that has a sensing end projecting from the carrier. The disc position identifiers are disclosed as alternating pole magnets, that is, a south pole magnet facing the sensor is followed by next adjacent magnet having a north pole facing the sensors. As these magnets pass next to the Hall effect sensor, the well known effect of a pulse is obtained to indicate rotation of the shaft. The rate of the pulses indicates the wheel speed.

The sensor is connected to a suitable computer where the signal for wheel speed is used in a desired manner, again, for example, for coordinating the wheel speed and angle of steer of wheels being driven, so that a differential action can be obtained during turns, and positive control of the forward or rearward velocity of the vehicle can be obtained as well.

BRIEF DESCRIPTION OF THE DRAWINGS

FIG. 3 is a vertical sectional view of a drive motor and motor carrier showing the output shaft mounting a magnet carrying disc relative to the sensor;

FIG. 4 is an exploded view of the mounting bracket and sensor utilized with the device of FIG. 3; and FIG. 5 is a view of a rotating disc used with the sensor taken along line 5—5 of FIG. 3.

DETAILED DESCRIPTION OF THE PREFERRED EMBODIMENTS

Figure 2:
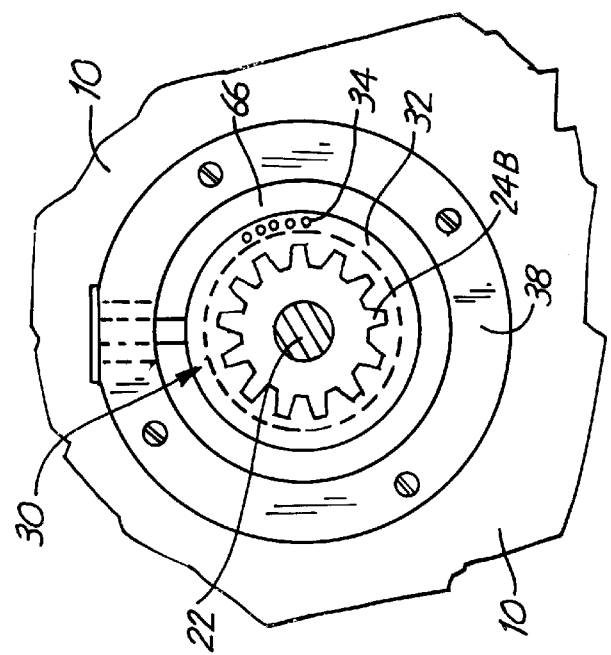
FIG. 2 is a sectional view taken as on line 2—2 in FIG. 3, with parts removed.
Figure 1:
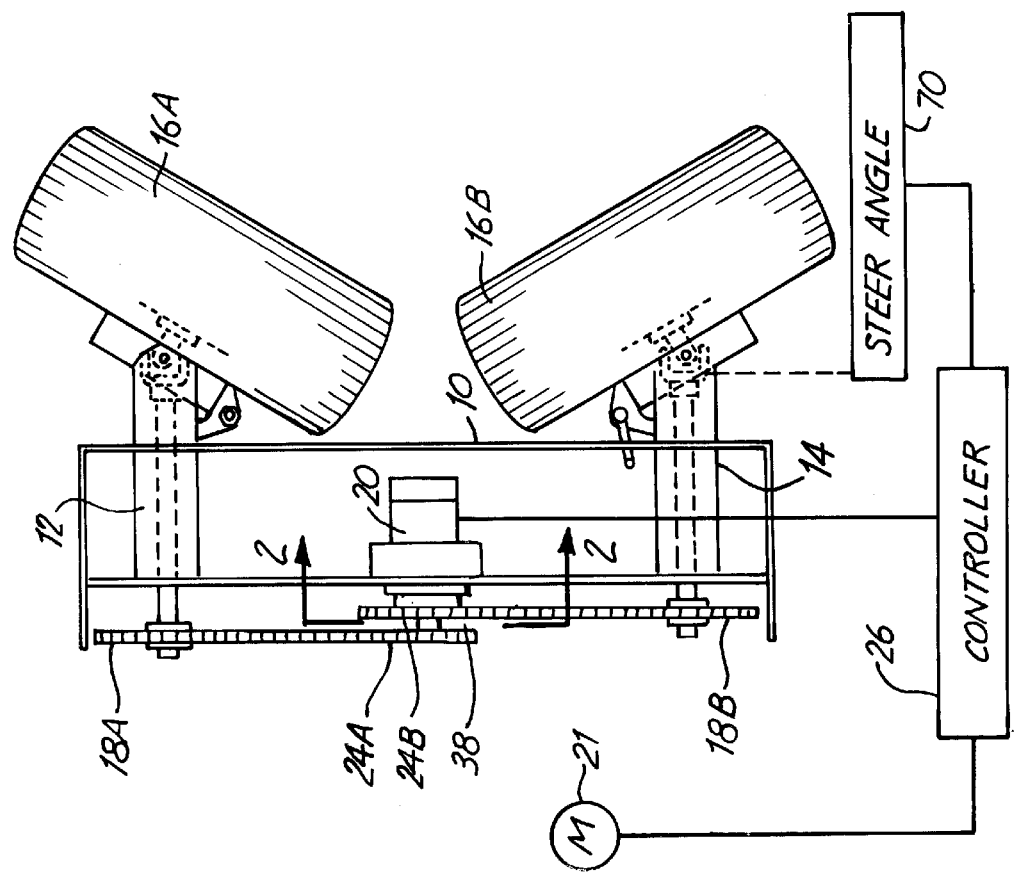
FIG. 1 is a fragmentary top schematic view of a typical frame for a loader which carries drive motors as well as the drive axles for the wheels.

A frame 10 for a vehicle, such as a fourwheel drive four-wheel steer loader, is shown schematically. Only one-half of the frame is shown for illustration purposes. Axle tubes 12 and 14 are at the front and rear of the frame or chain case 10. The axle tubes 12 and 14 support steerable wheel assemblies 16A and 16B in the form shown. The wheels are driven through axles that are in turn provided with sprockets 18A and 18B which are driven from a centrally located hydraulic motor 20. The motor 20 has an output shaft 22 that carries sprockets 24A and 24B for driving the front and rear wheels, respectively.

The drive motor 20 is controlled by a central computerized controller indicated generally at 26 and a second motor 21, that is used for driving wheels on the other side of the frame 10, (which wheels are not shown) is also controlled by the controller 26.

Each of the motors 20 and 21 are provided with rotation sensors, that sense the speed of rotation of the output shaft of the motor, which in turn provides a direct indication of the speed of the wheels 16A and 16B. Such a sensor assembly is shown generally at 30, and it includes a magnet carrying disc 32, shown in FIG. 5 for example, that has a plurality of magnets 34 that are quite small, but are discrete magnets individually located and spaced equally around the central axis of the disc adjacent the periphery on a suitable radius indicated at 36.

The magnets alternate in polarity, that is, alternately the north and south poles are at the side surface shown in 32A that faces a motor carrier 38 that is mounted onto the frame 10 in a suitable manner. The motor carrier 38 mounts the motor 20 that has the output shaft 22, which mounts the sprockets 24A and 24B.

The disc 32 is connected to rotate with the motor shaft in a suitable manner. The plane of the disc 32 is perpendicular to the axis of rotation of the shaft 22. The disc 32 can be attached to the sprocket 24B or suitable flanges on the shaft through the use of small cap screws, or even can be attached with adhesives.

The sensor assembly 30 in addition to the disc 32, includes a Hall effect sensor 48, that is supported on a bracket 50. The end of the Hall effect sensor is spaced a small distance from the plane of rotation of the disc 32, and faces the poles of the individual magnets. In a known manner, wherein a magnet moves past a Hall effect sensor a pulse will be generated and sent to the controller 26.

The bracket 50 is a T-shaped bracket that has a mounting plate 52 supported on a flat surface 54 on the periphery of motor carrier, and a depending tang 56 that is integral with the mounting plate 52, and perpendicular thereto. The tang 56 has an aperture in which a cap screw 58 is placed for supporting the Hall effect sensor 48 in position.

Suitable cap screws 60 are used for attaching the flat plate 52 to the flat surface 54 of the motor carrier.

A bore or hole 64 is provided from the flat surface 54 to an annular recess 66 in the motor carrier 38, and it is in this recess 66 that the Hall effect sensor 48 is carried, so that it is out of the way of moving parts, and protected from environmental damage on the interior of the chain case. The chain case has an opening 67 aligned with sensor 48 so the magnetic field of each magnet that passes will be sensed by sensor 48. The sensor 48 is recessed substantially into annular recess 66. The recess 66 surrounds the hub 44 that supports motor shaft 22.

The bracket 50 is easily mounted, and easily adjusted. It is rigid, so that it holds the Hall effect sensor 48 in proper position relative to the magnet carrying disc 32.

The sensor is accurate, it can be used for determining differential in speeds in the drive wheels on opposite sides of the machine, coordinated with a steer angle signal 70, from a sensor indicating the angle of steer of the wheels 16A and 16B to insure that there is a. differential in movement of the wheels on the inside of a tight turn relative to the outside wheels. Additionally, if the traction on the wheels is different, the wheels on each side can be controlled by adjusting the speed of motors 20 and 21 in response to wheel speed signals from sensor 30 to reduce the spinning of the wheels on one side of the frame 10 relative to the other. Other functions can be controlled by the speed sensed by the sensor 30, so that the vehicle is precisely controlled for industrial operations as a loader or for other work.

The bracket 50 is easily made and installed and utilizes space not normally occupied. The Hall effect sensor 48 is protected since it is in a recessed area.

Although the present invention has been described with reference to preferred embodiments, workers skilled in the art will recognize that changes may be made in form and detail without departing from the spirit and scope of the invention.

What is claimed is:

1. A sensor for sensing rotation of an output shaft motor having a motor carrier, the motor carrier having a recess on a side thereof, facing the output shaft, a disc on the output shaft of the motor having identifiable indicia carried at a known radial positions and arranged annularly around the disc, the disc having a plane oriented substantially perpendicular to the output shaft and a sensor supported in the recess of the motor carrier for sensing the indicia, a bracket for supporting the sensor comprising a T-shaped support having a depending tang extending into the recess and supporting an end of the sensor adjacent the disc carrying the indicia.

2. The sensor of claim 1, wherein the sensor is Hall effect sensor, and the indicia comprise magnets that move past the Hall effect sensor.

3. The sensor of claim 1, wherein said tang extends through a bore in a flange on the motor carrier that encloses at least a portion of the recess.

4. The sensor of claim 3, wherein an outer surface of said motor carrier is annular and the recess is annular, and the outer surface has a flat exterior surface portion adjacent the bore for supporting a flat plate bracket carrying the tang.

5. The sensor of claim 4, wherein said Hall effect sensor is supported on a single bolt passing through an aperture of the tang.

6. The sensor of claim 2, wherein said magnets have poles facing the Hall effect sensor, the poles alternating in polarity in an annular direction.

7. In a skid steer loader having a frame, a hydraulic drive motor for driving wheels on the skid steer loader, a motor carrier for the hydraulic motor, the motor having an output shaft, and the motor carrier being mounted onto the frame, the improvement comprising a sensor for sensing the rotation of the output shaft of the motor including a disc carrying a plurality of annularly spaced magnets thereon, the disc having a plane and the plane substantially perpendicular to the output shaft, and a Hall effect sensor supported on the motor carrier and having an end facing the magnets to sense passage of the magnets pass the sensor.

8. The improvement of claim 7, wherein said magnets have poles facing the Hall effect sensor, and the poles alternating in polarity in an annular direction.

9. The improvement of claim 8, wherein said motor carrier has an annular recess open on a surface of the carrier facing toward the disc, a radial bore in the motor carrier extending from the exterior into the recess, and a bracket for mounting the Hall effect sensor in the annular recess, said bracket including a tang portion extending through the bore.

* * * * *